- 15 — Back sizing coating
- 13 — Cured or vulcanized rubber
- 12 — Flexible backing (such as cloth or paper)
- 14 — Pressure-sensitive adhesive

- 16 — Rubber base pressure-sensitive adhesive
- 17 — Barrier film
- 13 — Vulcanized rubber
- 12 — Porous fabric backing
- 18 — Back sizing coating Inventor:
Richard Gurley Drew
By Paul Carpenter
Atty.

Patented Jan. 13, 1942

2,269,712

UNITED STATES PATENT OFFICE 2,269,712

ADHESIVE SHEET AND METHOD OF MAKING

Richard Gurley Drew, St. Paul, Minn., assignor to Minnesota Mining & Manufacturing Company, St. Paul, Minn., a corporation of Delaware Application April 20, 1938, Serial No. 203,103

10 Claims. (Cl. 91—68)

This invention relates to a pressure-sensitive adhesive sheet, conveniently in the form of tape, having a flexible backing provided with a layer of cured or vulcanized rubber. More particularly, the backing may be a flexible porous fibrous fabric, such as woven cloth, paper and combinations thereof; and the rubber layer may be cured or vulcanized after application thereto so that it enters into and fills the interstices, thereby binding the fibres together and resulting in a firm union between the rubber and backing. An adhesive coating, which is normally tacky and pressure-sensitive, may be united either to said rubber layer or, preferably, to the other side of the backing. In either case, a back sizing coating may be applied which is inactive to the adhesive to insure ease of unwinding or removal of the adhesive sheet or tape from rolls and stacks thereof without offsetting of adhesive or delamination. The adhesive, which may be of the rubber-resin type, is preferably highly coherent so that the adhesive sheet may be removed in condition for reuse from surfaces to which temporarily applied, and without leaving a residue of adhesive thereupon.

This application is a continuation-in-part of my copending applications Ser. No. 455,439½, filed May 24, 1930, as a division of Ser. No. 281,104, filed May 28, 1928, which issued as Patent No. 1,760,820 on May 27, 1930; Ser. No. 351,146, filed March 30, 1929; Ser. No. 660,167, filed March 9, 1933; and Ser. No. 743,122, filed September 7, 1934, as a continuation-in-part of application Ser. No. 491,412, filed October 27, 1930.

A particular object is to provide a masking sheet or tape for use in shielding adjacent areas during application of paint, lacquer, etc. Pressure-sensitive masking tape is widely used, for example, in the spray painting of automobile bodies.

An objection to masking tape having a cloth backing has been the latter's permeability to lacquer solvents, etc., which penetrate the backing and soften and loosen the adhesive coating, causing offsetting of adhesive upon removal of the tape, necessitating cleaning off the residue of adhesive from the surface. Also a cloth backing tape ordinarily has uneven, ravelling edges which makes it difficult or impossible to obtain a sharp, even boundary. An object of this invention is to provide a masking tape of this type which is an improvement upon, and better serves its purpose than, previously designed tape of the same general character by reason of the fact that the layer of rubber, which is cured or vulcanized after application, fills the interstices of the woven fabric, impregnates itself into the threads, forms straight, non-ravelling edges for the adhesive tape strip and renders the strip resistant to oils, organic solvents and water. This is true whether the rubber layer is applied to the face side of the backing, so as to underlie the subsequently applied adhesive layer, or is applied to the back side. It is evident that in either case the layer of vulcanized rubber will serve as a protective barrier to prevent lacquer solvents, etc., from striking through to the adhesive coating when the tape is used for masking purposes.

The masking tape made in accordance with this invention, whether the backing be of cloth or paper, is highly flexible or pliant, is readily applied, and may be removed in condition for reuse following application of the paint or lacquer without leaving a deposit of adhesive upon the underlying surface, and without pulling off the underlying paint or lacquer coating when it has been applied thereover.

The invention is not, however, limited to masking tapes, but may be utilized generally for the production of pressure-sensitive adhesive sheets and tapes.

When the adhesive sheet material is made with a porous paper foundation or backing sheet having a layer of cured or vulcanized rubber on the back side and a layer of pressure-sensitive adhesive on the face side, the material of both layers will penetrate into the paper to unify it. That is, the fibres of the paper will be bound together so that the backing will not split or the fibres pull loose under the force exerted by the pressure-sensitive adhesive when the product is unwound from rolls or removed from surfaces to which temporarily applied—that is, a fibre unity is provided which prevents the unity of the backing from being destroyed by the pull of the adhesive.

By "pressure-sensitive" I mean that the adhesive is normally tacky and non-drying and is stably in a condition such that it does not need to be activated by solvents or heat or otherwise prepared in order to secure good adherence to surfaces against which the adhesive sheet may be pressed. Furthermore, a "non-offsetting" adhesive layer is provided, meaning that the adhesive is possessed of such coherence in relation to adhesiveness and is so firmly united to its backing that the adhesive sheet may be stacked or rolled upon itself without offsetting upon separation or unwinding for use, and may be separated in condition for reuse from surfaces (not possessing special chemical affinity for the adhesive), to which it may have been temporarily applied, without offsetting of adhesive material.

The invention is illustrated in the accompanying drawing, wherein.

Figure 1:
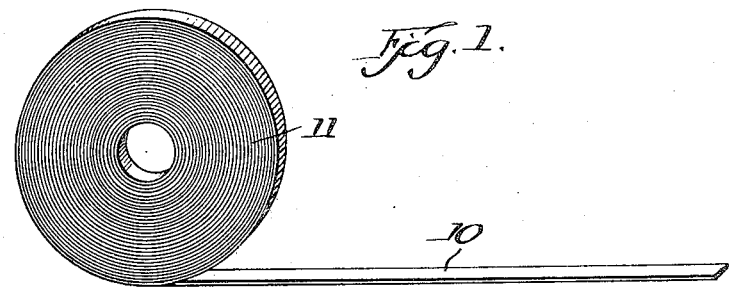
Fig. 1 is a perspective view of a roll of comparatively narrow pressure-sensitive adhesive tape wound upon itself.
Figure 2:
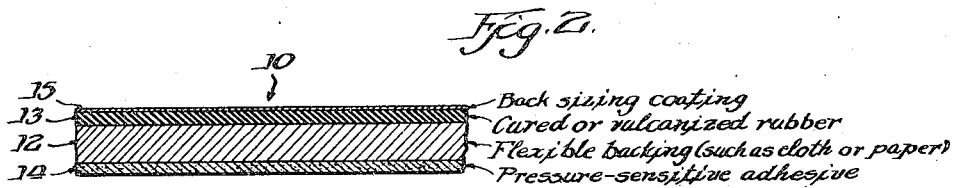
Fig. 2 is a magnified diagrammatical cross-sectional view of the tape showing the different constituent layers.

The tape 10 of roll 11 shown in Fig. 1 may be comprised as shown in Fig. 2, having a flexible backing 12, preferably of a porous fibrous fabric such as woven cloth or paper. When made of cloth it is preferably cut in the direction of one set of threads rather than on a bias, so that the threads run longitudinally and transversely. A protective coating or layer 13 of cured or vulcanized rubber is united to the back or outer side of the backing, and is preferably applied prior to application of the coating or layer of pressure-sensitive adhesive 14 which is united to the face or inner side of the backing. A back sizing coating 15 of resinous varnish such as shellac, glue, a cellulose-derivative such as cellulose acetate, cellulose nitrate or ethyl cellulose, or other suitabe film-forming material, is united to the outer surface of the vulcanized rubber layer to form a surface which is inactive to the adhesive coating to permit ready unwinding, the adhesive being less adhesive to this sizing coating than to the vulcanized rubber. This back sizing coating is also desirable in that it presents an attractive smooth glossy finish.

Figure 3:
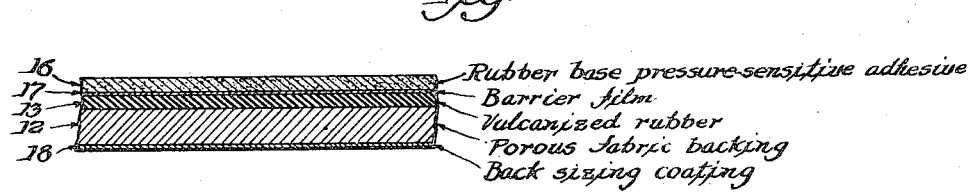
Fig. 3 is a further diagrammatical cross-sectional view showing an alternative form.

An alternative form is shown in Fig. 3, having a flexible backing 12 of porous fabric sheet material, a layer 13 of vulcanized rubber united to one side, and a layer 16 of rubber base pressure-sensitive adhesive upon the vulcanized rubber. A barrier film 17 of rubber containing a small percentage of alum is interposed between the vulcanized rubber layer and the adhesive layer to minimize migration of the vulcanizing agent from the former to the latter. A back sizing coat 18 is united to the outer or back side of the backing and unifies the fibres as well as presenting a back surface inactive to the adhesive coating.

By way of example, the following illustrates an application of vulcanized rubber to a flexible backing for use in accordance with this invention: A cotton cloth construction with a count of 64 x 64 threads per square inch and weighing 1 pound to every 7.6 yards of 30 inch width is knife coated with a layer of compounded rubber containing vulcanizing and accelerating agents. This may be made by milling together

| | Parts |
|---|---|
| Thin latex crepe | 50 |
| Zinc oxide | 50 |
| Palm oil | 1 |
| Sulfur | 1.7–2.0 |
| "Captax" accelerator | 0.25–0.5 |

In the above illustrative formula, as in all formulae given hereafter unless otherwise stated, all parts are by weight. The "Captax" accelerator is mercaptobenzothiazole. The compounded rubber may be coated upon the cloth by calendering or frictioning. In any case the rubber is forced into the cloth. The coated cloth is then wound in rolls 18 inches in diameter and placed in an electric oven where it is subjected to a temperature of 250° F. for 30 minutes, to cure or vulcanize the rubber.

The rubber mixture may be applied by coating the fabric with a solution or emulsion containing the desired ingredients, resulting in a layer ready for curing or vulcanization upon evaporation of the vehicle.

Vulcanizing agents may be used to cause cold vulcanization following application of the rubber to the backing.

A further example is the following: A light film of rubber compounded with zinc oxide is united to one side of a sheet of 40 lb. kraft paper and subsequently vulcanized with sulfur chloride, by exposure to sulfur chloride vapor, or to a solution of sulfur chloride in a diluent such as carbon disulphide or benzol. The compounded rubber may be comprised of equal parts of latex crepe and zinc oxide, and may be applied by knife coating, calendering or frictioning, or may be applied as a solution in a volatile solvent such as benzol, or as an emulsion.

Instead of using latex crepe, use may be made of smoked sheet rubber, and reclaimed rubber may be incorporated. Various fillers may be added to lend bulk to the compound, as is known in the rubber-compounding art.

If the thread count is low, when a cloth backing is used, a greater amount of rubber filler will of course be required than when a more tightly woven cloth is used.

The following illustrate pressure-sensitive adhesive compositions which may be used:

Adhesive Example 1

| | Parts |
|---|---|
| Plasticized, first quality plantation rubber, such as clear crepe or smoked sheets | 10 |
| Cumarone resin | 2 |
| Zinc oxide | ½ |

The above ingredients are compounded on a rubber rolling mill to a plastic consistency, and the resulting composition may be applied by calendering or frictioning to provide a coating of pressure-sensitive adhesive on either side of the backing (which has previously been provided with a coating of vulcanized rubber). Or the composition may be cut to desired consistency with a volatile rubber solvent, such as benzol, naphtha, heptane or gasoline, and then coated so as to leave a layer of pressure-sensitive adhesive upon evaporation of the solvent.

In lieu of a synthetic resin, use may be made of a natural resin such as gum or wood rosin, Burgundy pitch or pine oil foots.

Adhesive Example 2

| | |
|---|---|
| Rubber base consisting of equal parts of latex crepe or smoked sheets and zinc oxide milled together lbs | 605 |
| Soft cumar resin lbs | 196 |
| Benzol gallons | 125 |

The rubber base, resin and benzol are churned together until homogeneous.

Adhesive Example 3

| | Parts |
|---|---|
| Latex crepe | 100 |
| Zinc oxide | 100 |
| Wood rosin | 45 |
| Beta-naphthol | 1 |
| Heptane | 450 |

The latex crepe and zinc oxide are milled together on a rubber mill until the latter is thoroughly incorporated in the rubber. The mixture is then placed in a churn with the other ingredients and mixed for about 24 or more hours, producing a homogeneous adhesive solution ready for application. In this case the zinc oxide hardens the rosin as well as acting as a reinforcing pigment. The beta-naphthol serves as an antioxidant.

The above rubber-resin type of pressure-sensitive adhesive is non-offsetting, water-insoluble and moistureproof.

Pressure-sensitive adhesive compositions other than those containing rubber may be utilized, the invention not being limited to the use of any one particular kind of adhesive. For example, the pressure-sensitive adhesive may be of the type disclosed in the application of Hubert J. Tierney, Ser. No. 177,094, filed November 29, 1937.

A further example of a suitable flexible backing sheet material is a composite of cloth and felted paper material, such as is described in my copending application Ser. No. 351,146, filed March 30, 1929. A woven fabric may be used, such as cheesecloth or gauze, which may be starched or sized. This cloth may be placed in position upon a paper making machine blanket to receive a paper pulp, such for example, as may be employed in making 35 pound per ream absorbent paper, and this layer is applied to the cloth and either pressure or suction applied to both which serves to remove the moisture from the paper pulp and also to cause the pulp while still in a plastic state to enter the interstices in the woven fabric, as well as to expose the spun or woven fabric to the wetting action of the extraneous fluid and of the paper size carried thereby.

An alternative method is to combine the cloth with a sheet of paper (as distinguished from the pulp) still carrying 50% or more of the required forming water, or with preformed absorbent paper (such as towelling) which is suitably moistened. The paper sheet is applied to the woven fabric and the two materials are run together through a wringer or other presser rolls, which force the woven fabric and fibres of the paper sheet into intimate union.

A more thorough bond may be secured by employing a suitable adhesive substance, such as corn dextrine, casein or glue, applied as a sizing to the woven fabric. This sizing is applied to the side of the fabric which is to come in contact with the wet paper sheet or pulp, so that when the cloth and wet paper are combined, the adhesive will be moistened and thus rendered effective in enhancing the bond between the paper and cloth.

Upon drying, a flexible sheet is obtained which possesses desirable characteristics of both paper and cloth.

The paper side may be treated with glue, glycerine and formaldehyde to unify it, or with a sizing material, to strengthen the paper side, the other side being reinforced by the cloth, when the pressure-sensitive adhesive is to be applied to the cloth side. The cloth side may be desirably treated with a thin rubber solution which possesses adhesive qualities so as to adhere to the surface of cloth and paper fibres, and which may or may not carry proper vulcanizing and accelerating agents. Preferably a vulcanizing agent is included in this size or filler coat and the article vulcanized under the required heat treatment, where such type of vulcanizing agent is used as will require heat treatment. Cold vulcanizing agents, however, may be used in the absence of heat treatment. This vulcanized rubber treatment insures the tape against damage due to penetration by the lacquer or lacquer solvent when the tape is used as a masking tape. The pressure-sensitive adhesive (which may be a rubber base adhesive) may be applied to either side of the resulting backing. When applied to the cloth side, that is, upon the vulcanized rubber layer, the other side (paper side) is preferably sized, as heretofore indicated.

The resulting adhesive sheet may then be cut into tape strips, preferably so that the cloth threads run transversely and longitudinally.

What I claim is as follows:

1. An adhesive sheet or tape comprising a flexible backing, a layer of rubber united to one side thereof that is cured or vulcanized after application to provide a layer resistant to oils, organic solvents and water, a layer of pressure-sensitive adhesive united to one side of the resultant combination, and an exposed surface opposite to the adhesive surface of a kind inactive to the latter to permit removal or unwinding from stacks and rolls without offsetting of adhesive.

2. An adhesive sheet or tape comprising a flexible porous fibrous fabric backing, a layer of rubber united to one side thereof that is cured or vulcanized after application so that it penetrates and unifies the fibres and provides a layer resistant to oils, organic solvents and water, a layer of pressure-sensitive adhesive united to one side of the resulting combination, and an exposed surface opposite to the adhesive surface of a kind inactive to the latter to permit removal or unwinding from stacks and rolls without offsetting of adhesive.

3. An adhesive sheet or tape comprising a flexible porous fibrous backing, a layer of rubber united to one side thereof that is cured or vulcanized after application so that it penetrates and unifies the fibres and provides a layer resistant to oils, organic solvents and water, said layer containing a vulcanizing agent, a barrier film upon said layer of a kind resistant to migration of said vulcanizing agent therethrough, a layer of pressure-sensitive rubber base adhesive united to said barrier film, and a back sizing coating upon the backing and of a kind inactive to the adhesive to permit removal or unwinding from stacks and rolls without offsetting of adhesive.

4. An adhesive sheet or tape comprising a flexible backing including a paper sheet and a woven fabric embedded in one side thereof, a layer of rubber on the woven fabric that is cured or vulcanized after application and is resistant to oils, organic solvents and water, and is impregnated into the backing, and a layer of pressure-sensitive adhesive united to the other side of the backing.

5. An adhesive sheet or tape comprising a flexible backing including a paper sheet and a woven fabric embedded in one side thereof, having a layer of vulcanized rubber united to said woven fabric to provide a barrier to lacquer solvents, and a layer of pressure-sensitive adhesive united to one side of the backing, so that when the adhesive sheet or tape is applied to a surface the layer of vulcanized rubber will overlie and protect the layer of pressure-sensitive adhesive.

6. That improvement in the manufacture of tape which comprises applying to one face of a flexible strip a solution of rubber adapted to provide a layer of modified rubber united to the strip which is non-tacky and non-adherent to the touch of the hand, and afterwards applying a pressure-sensitive adhesive to the other face of the strip.

7. That improvement in the manufacture of tape which comprises applying to one face of a flexible strip a solution of rubber adapted to provide a layer of vulcanized rubber united to the strip which will act as a barrier to oils, organic solvents and water, and afterwards applying a pressure-sensitive adhesive to the other face of the strip.

8. That improvement in the manufacture of tape which comprises applying to one face of a porous paper sheet a solution of rubber adapted to provide a layer of vulcanized rubber united to the paper which will act as a barrier to oils, organic solvents and water, and afterwards applying a pressure-sensitive adhesive to the other face of the strip.

9. An adhesive sheet or tape comprising a flexible porous fibrous backing having a layer of vulcanized rubber united to one side, and a layer of pressure-sensitive adhesive on one side of the backing, so that when the adhesive sheet or tape is applied to a surface the layer of vulcanized rubber will overlie the adhesive layer to prevent penetration by oils, organic solvents and water.

10. An adhesive sheet or tape comprising a flexible fibrous backing, a layer of vulcanized rubber united to one side thereof so that it penetrates the fibres and provides a layer resistant to oils, organic solvents and water, said layer containing a vulcanizing agent, a barrier film upon said layer of a kind resistant to migration of said vulcanizing agent therethrough, and a layer of pressure-sensitive rubber base adhesive united to said barrier film.

RICHARD GURLEY DREW.